Sept. 11, 1928.  1,683,797
A. J. PEREYRA
APPARATUS FOR FORMING AND THEREAFTER RELEASING TORTILLA
Filed July 3, 1925  2 Sheets-Sheet 1
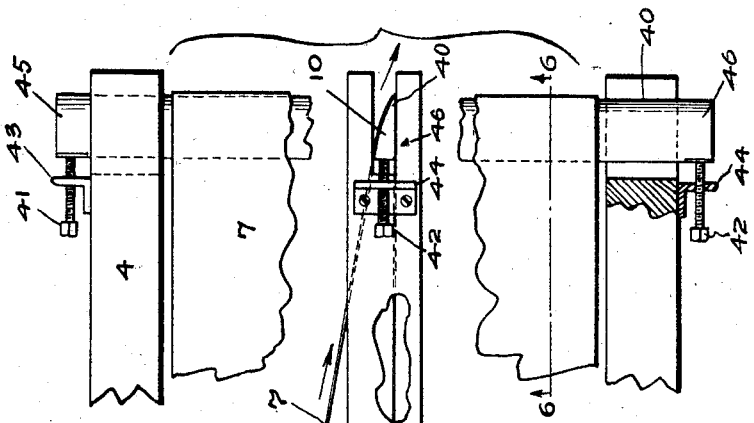
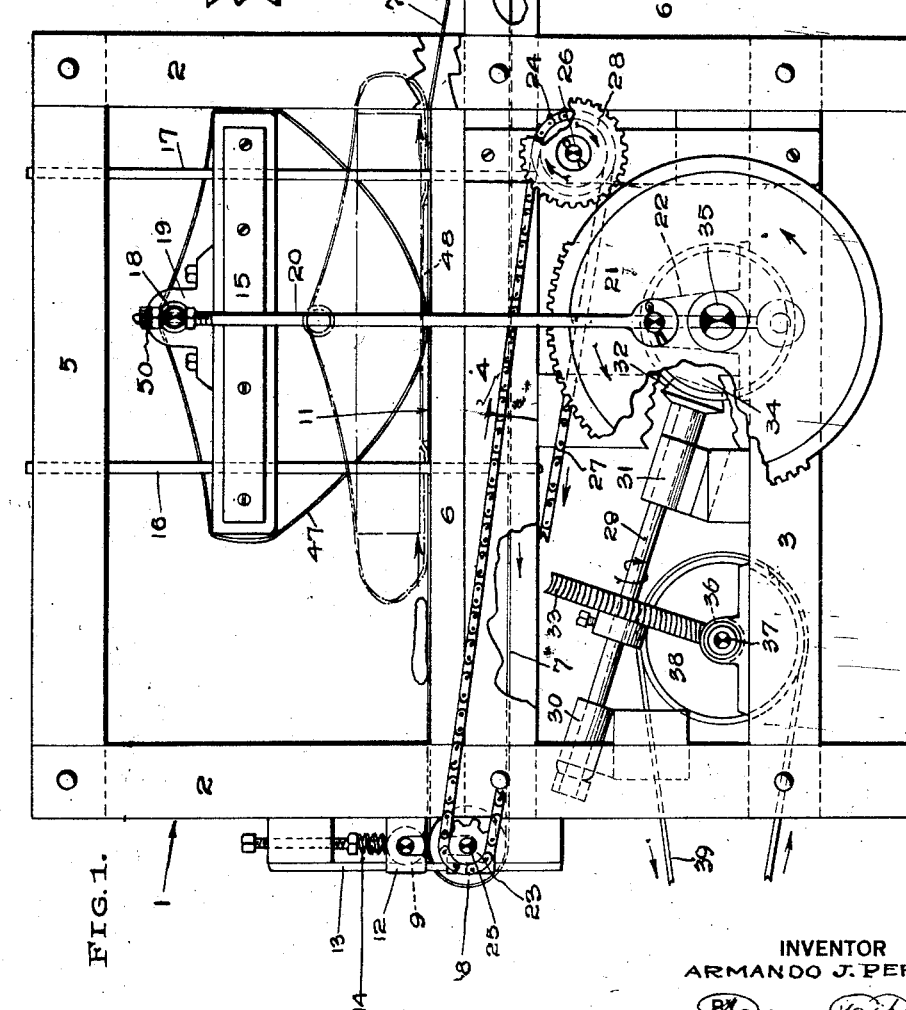
INVENTOR
ARMANDO J. PEREYRA
ATTORNEY Sept. 11, 1928.
A. J. PEREYRA
1,683,797
APPARATUS FOR FORMING AND THEREAFTER RELEASING TORTILLA
Filed July 3, 1925 2 Sheets-Sheet 2
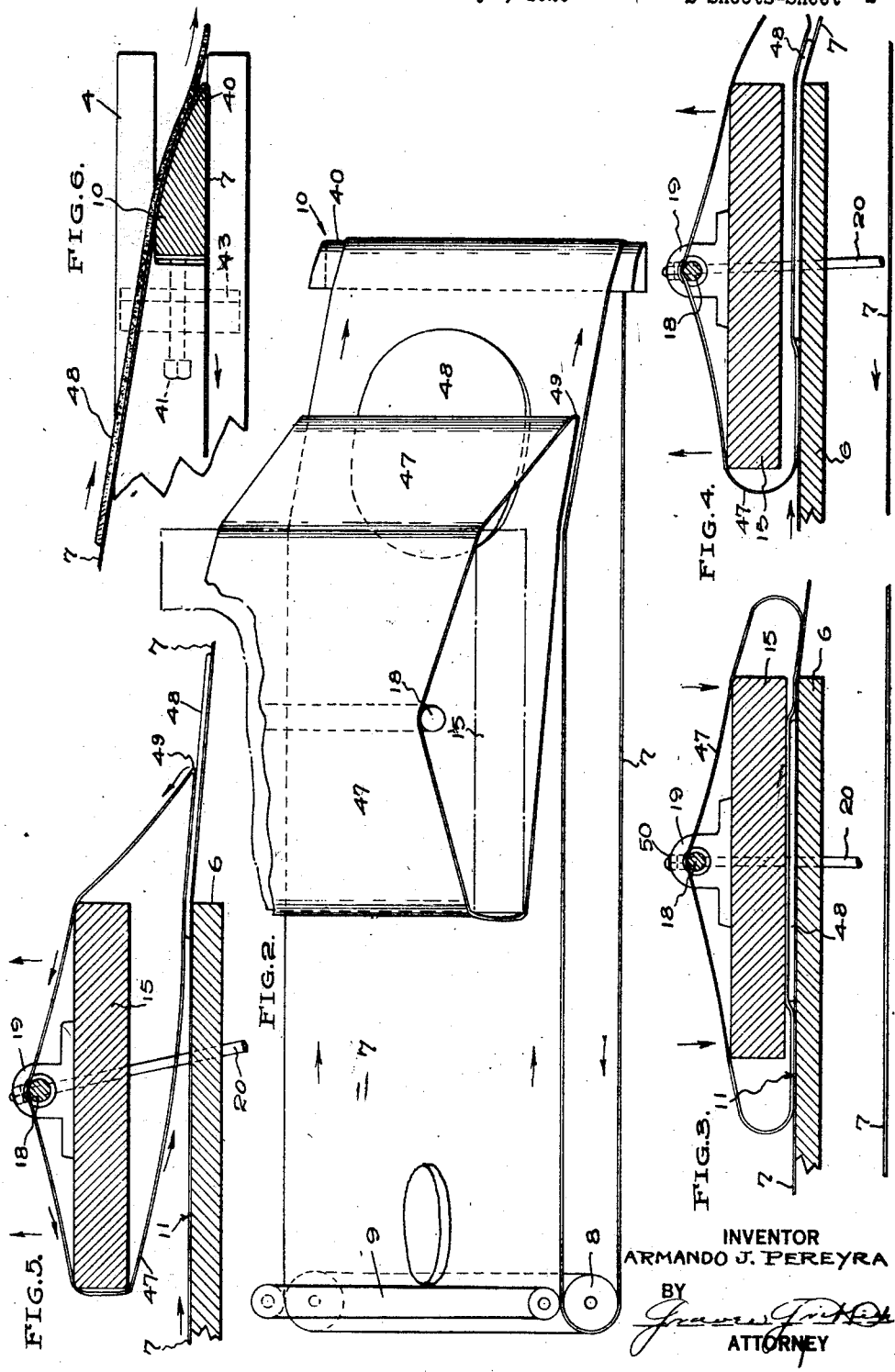
INVENTOR
ARMANDO J. PEREYRA
BY
ATTORNEY Patented Sept. 11, 1928.

1,683,797

UNITED STATES PATENT OFFICE.

ARMANDO J. PEREYRA, OF SAN FRANCISCO, CALIFORNIA.

APPARATUS FOR FORMING AND THEREAFTER RELEASING TORTILLA.

Application filed July 3, 1925. Serial No. 41,417.

The present invention relates to apparatus for forming flat cakes through pressure, as opposed to rolling, and means for their detachment after being thus formed from the conveyer upon which their formation has taken place, and has in view more particularly quantity production of the tortilla, an unleavened flat cake made of coarse meal of maize, or Indian corn, baked on hot metal surfaces or stones, and used universally throughout Mexico as a substitute for bread.

Owing to the character of this meal and its lack of cohesiveness when mixed, the practice is to subject it to a lime treatment, which both bleaches it and gives it the necessary stickiness to insure proper adhesion of particles when the dough is manipulated. This treatment not infrequently results in an undue stickiness of the dough, rendering handling and baking difficult and requiring that, for the prevention of sticking to hands or hot plate, it, or the plate, or both, be dredged with lime powder.

A prime object of my invention is the provision of a mechanical means for the production, cheaply and hygienically, of the tortilla in quantity, wherein the operation is a positive and continuous one and the removal of the finished product from the conveyer is automatically accomplished.

In the accompanying drawings, forming a part of this specification, and in which similar characters of reference refer to like parts, throughout,—

Figure 1 is a side elevation illustrative of a machine embodying the principles of my invention, showing the main conveyer-belt, gear-train for its actuation, stamping-member for stamping the tortilla upon the conveyer-belt, and the means for actuating the stamping-member, the dot-and-dash position indicating the position assumed by the stamping-member when at the limit of its downward stroke;

Figure 2 is a schematic view, showing the endless conveyer-belt, the tensioning rolls, and the position of the stamping-member and its slack stamping-belt of woven endless-belt character and two-way movement, with respect to the endless conveyer and subsequent to the forming operation of the forming-member;

Figure 3 is a sectional detail of the conveyer-table and conveyer-belt, showing the stamping-member at the limit of its downstroke and a tortilla pressed to shape between the conveyer-belt and stamping-member prior to the upstroke of said member and substantially at the instant of forward movement of the conveyer-belt;

Figure 4 is a view analogous to that of Figure 3, showing the start of the upward stroke of the stamping-member and release of the pressed tortilla, with the conveyer-belt free for forward movement to convey the newly formed tortilla beyond the stamping-member;

Figure 5 is a view, analogous to Figures 3 and 4, illustrative of the continued upward movement of the stamping-member and belt, and the continued forward movement of conveyer-belt and the pressed tortilla, with the resultant gradually performed stripping action separating the stamping-belt from the stamped tortilla through the forward drag exerted by the conveyer-belt upon the slack of the forming-belt;

Figure 6 is an enlarged sectional detail of the wedge-shaped releasing element co-acting with the conveyer-belt movement for the separation from said belt of the tortilla, this element being adjustably secured at the discharge end of the device and provided with a means over which the conveyer-belt passes at an angle best adapted to insure the positive separation of the tortilla from the belt, as shown in Figure 7, the view being taken thereon on line 6—6; and Figure 7 is a fragmental plan view of the discharge end of the conveyer, showing the wedge-shaped releasing element and means for its adjustment longitudinally for tightening the conveyer-belt.

Referring to the drawings in detail, the embodiment shown comprises a suitable supporting frame 1 consisting of uprights 2, cross-braces 3, 4 and 5, and conveyer-table 6; an endless conveyer-belt 7, preferably of rubber sheeting, held taut by means of a guide-roller 8 and spring-pressed idler 9 at one end of the apparatus and at the other by an adjustable wedge-shaped tortilla releasing element 10 mounted between the bifurcated ends of the braces 4, an intermediate section 11 of said belt being adapted to lie flat upon the upper surface of the conveyer-table 6 and be drawn thereacross at predetermined intervals, as hereinafter described; an idler roller 9 mounted in vertically movable bearings 12 supported by guides 13 adapted for guiding and varying the tension of the conveyer-belt, the tension being adjustable by means of the set-screw and spring 14; a forming-member 15, comprised of any suitable material, adapted for vertical movement between the braces 5 and conveyer-table 6 and held in position by means of a plurality of guide-rods 16 and 17, the said member being provided with a centrally arranged cross-rod 18 mounted in bearings 19 and connected by means of connecting-rods 20 to a driving-gear 21 at one side of the device and to a crank 22 at the opposite side, the said member 15 being adapted for vertical movement upon its guide-rods 16 and 17, from the limit of its upstroke, Figure 1, to a position slightly above the conveyer-belt 6, as shown in dot-and-dash lines; means for intermittently moving the conveyer-belt 7, comprising a gear adapted for movement at predetermined intervals and consisting of sprocket-gears 23 and 24 mounted, respectively, upon the roller-shaft 25 and a shaft 26, the said gears 23 and 24 being connected by a sprocket-chain 27; a pinion 28 mounted upon the shaft 26 adjacent the sprocket 24 and adapted to mesh with the mutilated driving-gear 21, whose teeth cover substantially one-half its circumference, mounted upon a shaft 35; a means for driving the gear 21 continuously in the direction indicated by arrows in Figure 1, comprising a shaft 29 mounted in bearings 30 and 31 and carrying a bevel-pinion 32 and worm-gear 33, the said pinion 32 meshing with a bevel-gear 34 mounted upon the shaft 35 and the worm-gear 33 meshing with a worm-pinion 36 mounted upon the shaft 37 driven from any source of power by the pulley 38 and the belt 39, the conveyer-belt 7 being drawn over the comparatively sharp edge 40 and inclined surface of the wedge-shaped releasing element 10, there being considerable tension exerted upon said belt by means of the adjusting bolts 41 and 42 tapped into the brackets 43 and 44 and bearing against the inner edges near the extremities 45 and 46 of said element 10; and an endless belt 47 mounted upon the stamping member 15 and extending over the cross-rod 18 and comprised of a piece of rubber sheeting similar to that of the conveyer-belt and of a like width and adapted to hang loosely from the said rod 18 and stamping-member 15, when said member is at the top of its stroke, as shown in Figure 1, and adapted to be brought down and pressed tightly against any article 48 that may be carried into position between said belts 7 and 47 to form it into a thin cake, when at the lowest limit of its downward stroke, as shown in Figures 1 and 3.

The operation of the device is as follows:

The shaft 35 and gear 21 are continuously driven through the gear-train, 29, shaft 37 and pulley 38, and the stamping-member, consequently, continually actuated through the rods 20 and gear 21, the stroke being from that shown in free lines to the dot-and-dash position directly above the conveyer-belt, as indicated in Figure 1.

The number of teeth carried by the mutilated gear 21 determine the movement of the conveyer-belt and the engagement of said gear with the pinion 28 is timed in such manner as to move the conveyer-belt a predetermined distance to move a selected portion of dough placed thereon, Figure 1, into position directly under the stamping-member 15 and stopping at this point until said stamping-member has reached the limit of its downward stroke and pressed the dough to shape between the stamping-member belt and the conveyer-belt and, simultaneously, starting it on its delivery movement upon its release by the return stroke of the stamping-member.

It will be noted, with reference to Figure 3, that the stamping-member has completed the pressing, or stamping, of the dough and is ready for its return stroke, and, in Figure 4, the return stroke of the stamping-member is underway, with the conveyer-belt 7 started on its way to convey the pressed tortilla to the delivery end of the device and a section of the stamping-belt 47 has been pressed into the dough and is being drawn forwardly with the pressed tortilla and conveyer-belt, the three forming virtually a unit, at this stage. As indicated in Figure 5, the conveyer and stamping-member acting in unison are gradually peeling the belt 47 away from the tortilla, as indicated at the point 49, the belt being drawn taut against the opposite edge of the stamping-member and, due to the upward movement of said stamping-member and outward pull of the conveyer-belt, is virtually moving in the direction of the arrows, as therein indicated, until the section adhering to the tortilla has been entirely peeled off and raised to the full line position, as shown in Figure 1. When the pressed and formed tortilla has been released from the stamping-member belt, it still tightly adheres to the conveyer-belt, from which it is released by the action of the conveyer passing over the edge 40 of the element 10, the peeling of the one from the other being in manner substantially as previously described.

The force of the thrust of the stamping-member may be adjusted to vary the thickness of the tortilla 48 by means of the threaded upper ends of the rods 20 and jam-nuts 50.

The wedge-shaped element 10 may be of any material, though preferably of wood, although a taut wire or rod properly placed may be made to substantially serve the same purpose.

I claim:

1. A machine for forming tortilla from a prepared dough, having an intermittently moving endless conveyor-belt adapted to deliver a measured portion of dough for the formation of a tortilla to a predetermined position of temporary rest, a reciprocable stamping member co-operatively associated with said conveyor-belt and bearing a loosely mounted stripping-belt adapted for two-way movement when in contact with said measured portion of dough as carried by the conveyor-belt, means for exerting pressure upon said delivered dough while in a position of rest through the action of said stamping member to cause to be formed between the said belts the tortilla, and means whereby the parting movements of said belts cause the dough-contacting side of said stripping-belt, through the reverse action of its upper side relative to that of its under side and the direction of movement of the conveyor-belt, to gradually peel the entire dough-contacting underside of said stripping-belt from the formed tortilla as it is being carried along forwardly by the said conveyor-belt.

2. A machine for forming tortilla from a prepared dough, having an intermittently movable endless conveyor-belt adapted to deliver a measured portion of prepared dough for the formation of a tortilla to a predetermined position of temporary rest, a reciprocable stamping-member co-operatively associated with said conveyor-belt and bearing an endless stripping-belt of relatively loose character and adapted for two-way movement when contacting with said measured portion of dough as carried by the conveyor-belt, means coacting with said stamping-member for exerting pressure upon said delivered dough to cause the forming of a tortilla between said belts, and means whereby the parting movements of said belts, caused primarily by the retraction of said stamping-member, cause the dough-contacting side of said stripping-belt, through the reverse movement of its upper side relative to that of its lower dough-contacting side and the movement of the conveyor-belt, to gradually peel the entire dough-contacting underside of said stripping-belt from the formed tortilla as it is being carried forward by said conveyor-belt.

In testimony whereof I have affixed my signature.

ARMANDO J. PEREYRA.